United States Patent Office 3,016,107
Patented Jan. 9, 1962

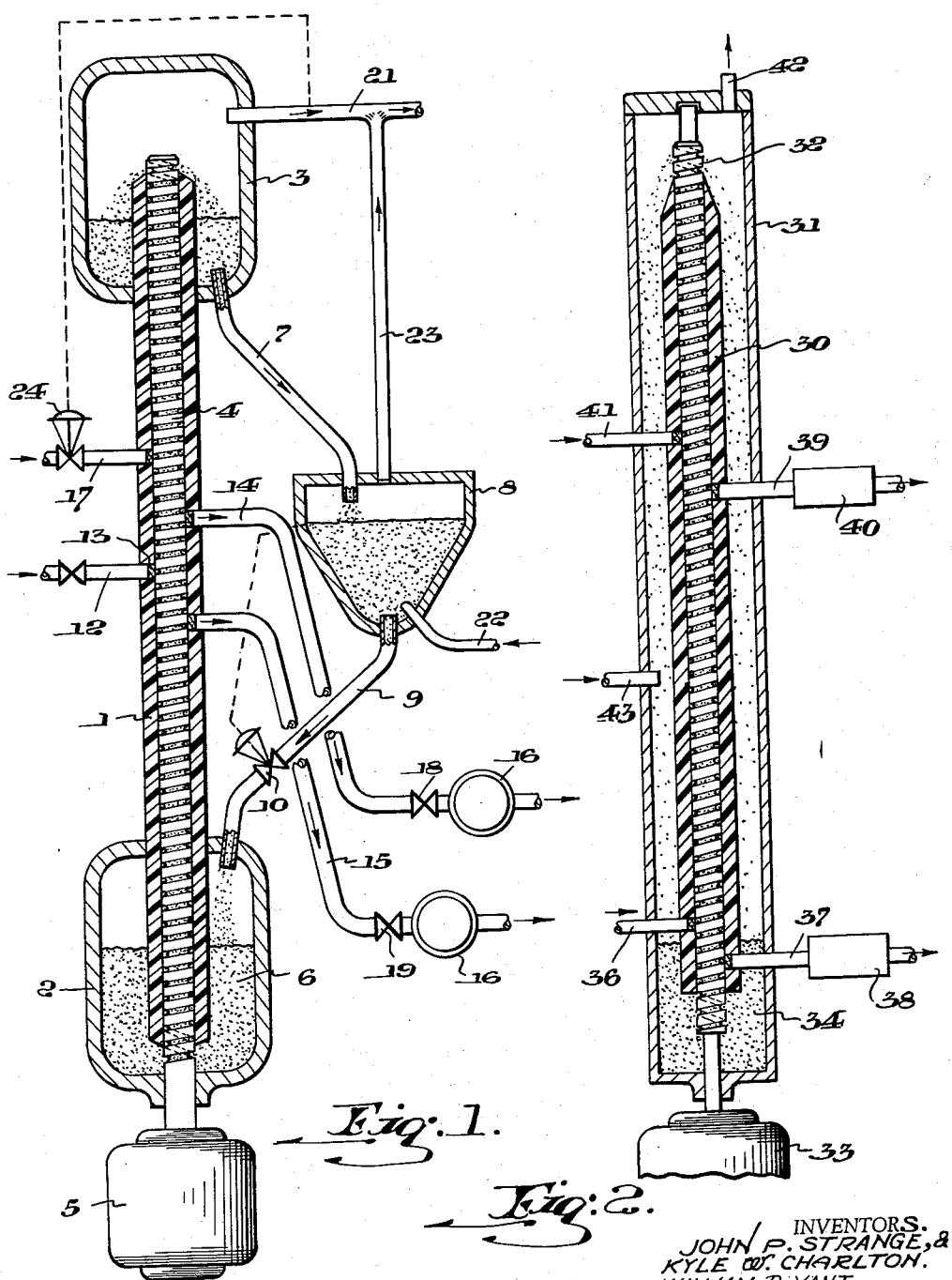

3,016,107
METHOD AND APPARATUS FOR CONTINUOUS SEPARATION OF COMPONENTS OF A GASEOUS MIXTURE

John P. Strange, Murraysville, Kyle W. Charlton, Monroeville, and William P. Yant, Murraysville, Pa., assignors to Mine Safety Appliance Company, Pittsburgh, Pa., a corporation of Pennsylvania
Filed Mar. 24, 1959, Ser. No. 801,648
5 Claims. (Cl. 183—2)

This invention relates to gas chromatography, and more particularly to the continuous separation of gases into fractions.

In gas chromatography a gas mixture or sample is separated into components having different volatilities. The mixture is passed through a column of gas adsorption material or a pervious material coated with a liquid to make use of the partition coefficient of the sample. Both types of material will be referred to herein as gas separation material. If the components of the mixture have different volatilities, so that one of them has less affinity than another for the separation material, the first component will be carried by an eluting gas through the packing while the remaining component or components will be held back by the packing material but will appear later in the eluting gas stream.

It is among the objects of this invention to provide a simple method and apparatus for separating components of a gaseous mixture continuously, in which two or more fractions can be obtained, and in which the separation material is recirculated continuously.

In accordance with this invention, a column of gas separation material is moved lengthwise continuously, and the material at the downstream end of the column preferably is collected and fed back to the upstream end of the column. An eluting gas is delivered to the column at a predetermined inlet point and is released from it at two outlet points spaced lengthwise of the column in locations where some of the eluting gas will flow upstream through the column to both of the outlet points and the rest of the eluting gas will flow in the opposite direction. A volatile mixture containing components having different volatilities is delivered to the column between the two outlet points. By selecting a packing material, for which one of the fractions of the mixture will have less affinity than the rest of the mixture, the first fraction will be carried by the eluting gas upstream through the column and out of it at the upstream outlet point. The rest of the mixture will be carried by the column downstream toward the other outlet point, where at least part of it will escape with the eluting gas leaving at that point. Any remaining fraction will leave the downstream end of the column. A stripping gas may be passed through the packing material as it circulates from the downstream end of the column to the upstream end. Suitable apparatus for carrying out this method includes a stationary conduit in which there is a conveyor that carries the packing material through the conduit from one end to the other. The return of the packing material outside of the conduit may be by gravity.

The invention is illustrated in the accompanying drawings, in which:

FIG. 1 is a vertical section through one embodiment; and

FIG. 2 is a vertical section through another embodiment.

Referring to FIG. 1 of the drawings, a straight tube or conduit 1, which preferably is vertical, has its lower end mounted in a feed reservoir 2 and its upper end mounted in a receiving or collecting reservoir 3. Extending entirely through the conduit is a rotary screw conveyor 4 that engages the inner surface of the conduit. The lower end of the conveyor is journaled in the bottom of the feed reservoir, where it fits in such a manner that gas will not escape around it. The projecting lower end is operatively connected with an electric motor 5, by which it is driven at any desired speed. Gas separation material 6 in the feed reservoir is picked up by the flights of the screw conveyor and carried upward through the conduit, from the upper end of which the material cascades into the lower part of the collecting reservoir. The separation material moving upward through the conduit forms a packing column.

The loose packing material in the upper reservoir can be returned to the lower one in any suitable manner for recirculation through the conduit. One way of doing this is to provide the bottom of the upper reservoir with a downwardly extending pipe 7, through which the packing material can flow by gravity, aided by vibration of the pipe if necessary, into a hopper 8 beside the conduit. The bottom of the hopper is connected with the top of the lower reservoir by another pipe 9, which may contain a throttling valve 10 that is controlled in a well-known manner by the level of the material in the hopper so that a substantially constant level of packing material will be maintained in the feed reservoir.

At a suitable point between the two reservoirs, the side of the conduit is provided with an inlet opening, to which a pipe 12 is connected for delivering a gas mixture to the packing column inside the conduit. To prevent packing material from entering the inlet from the column, the inner end of the inlet is filled with gas pervious material 13, such as sintered metal frit. The column is provided with an outlet above the gas inlet and another outlet below the inlet. These outlets are connected by pipes 14 and 15, respectively, to suitable gas detectors 16. Above both of the outlets the column is provided with a second inlet for a suitable eluting gas, delivered to it through a pipe 17.

In the operation of this apparatus a sample gas mixture, composed of known components having different volatilities, is delivered to the sample inlet through pipe 12. Generally, the gas sample will be mixed with a suitable carrier gas, such as nitrogen. The finely divided separation material, of which the packing column is formed, is one for which one of the components or fractions of the gas mixture has less affinity than the rest of the mixture. Such materials are well known and form no part of this invention. Activated charcoal is suitable for some gases. The eluting gas, such as air or the like, from pipe 17 will flow in both directions through the column. Some of it will flow upstream relative to the direction of movement of the column and escape through the upper outlet pipe 14. Some will continue down through the conduit past that outlet and leave through the lower outlet pipe 15. The rest of the eluting gas will flow in the opposite direction and out of the top of the conduit. By suitable throttling valves 18 and 19 attached to the outlet pipes, the relative amount of eluting gas leaving the column at each outlet can be controlled.

The gas sample entering the column will be separated into fractions by the separation material. The line of least resistance for this gas will be down through the column to the lower outlet pipe 15 because flow in the opposite direction is restrained by the downwardly flowing eluting gas that is flowing countercurrent to the column toward the lower outlet. Therefore, the gas fraction that has the least affinity for the separation material will be carried countercurrently through it by the eluting gas and out of the lower outlet. The rest of the entering sample, however, will be adsorbed or dissolved by the packing sufficiently to be carried by it toward the upper outlet pipe 14 if the packing is moving upward at the proper speed in relation to the flow rate of the purge gas. As the upwardly moving column carries this remaining component or components of the mixture upward through the conduit, the downwardly flowing eluting gas will elute the adsorbed or dissolved gas and will carry part or all of it out of the upper outlet pipe 14. Any fraction that the luting gas does not elute before it passes the purge gas inlet will usually be eluted by the time it reaches the upper end of the column and therefore will flow out of the upper end of the conduit and leave the upper reservoir through a pipe 21. When the entering sample contains only two fractions, such as methane and ethane, substantially pure methane (mixed with eluting gas) will leave the column at the lower outlet and the other fraction (mixed with eluting gas) will leave at the upper outlet.

If it is found that a highly adsorbed gas, such as propane, is not completely eluted from the packing material deposited in the upper reservoir, that material can be cleaned by introducing a stripping gas, such as air, into the bottom of hopper 8 through a pipe 22. The gas stripped from the packing material in this way escapes up through a pipe 23 that may be connected to outlet pipe 21 from the collecting reservoir. A constant flow rate of eluting gas can be maintained by means of a constant differential pressure flow regulator 24 controlling pipe 17 from outlet pipe 21 in a known manner.

Efficiency of separation is dependent on such factors as type of column packing, adsorption and partition characteristics of the gas components, flow rates, temperature, column geometry, etc.

In the modification of the invention shown in FIG. 2, the conduit 30 is supported in any suitable manner in a hollow vertical casing 31 of considerably greater cross sectional area than the conduit. Journaled in the opposite ends of the casing are the extremities of a screw conveyor 32 that extends through the conduit. The lower end of the conveyor extends out of the casing and is driven by an electric motor 33. The flights of the conveyor screw extend out of both ends of the conduit. The lower portion of the casing around the lower part of the conduit and conveyor serves as a reservoir for finely divided gas separation material 34 that is carried up through the conduit by the conveyor to form a packed column. As the material emerges from the upper end of the conduit, it cascades down around it for recirculation.

A sample of a desired gas mixture is delivered to the column through a pipe 36 that extends through the sides of the casing and conduit. Below this inlet the conduit is provided with an outlet connected by a pipe 37 that delivers gas to a suitable detector 38. Farther up the column there is another outlet pipe 39 and detector 40. Above this upper or downstream outlet there is an inlet for an eluting gas entering through a pipe 41. These pipes are provided with suitable valves, not shown.

The operation of the apparatus described thus far is the same as that shown in FIG. 1. Most of any gas that is so highly adsorbed that it does not pass out through outlet pipes 37 and 39 is carried up past the eluting gas inlet 41 and is eluted by the time it reaches the upper end of the column. It escapes from the casing through an outlet 42 at its top. If complete elution has not taken place at this time, the separation material falling down through the casing can be cleaned by a stripping gas delivered to the casing through a pipe 43 in its side. An advantage of this embodiment of the invention is that no external pipes and the like are required for returning the separation material from the top to the bottom of the column.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A method of continuously separating a gaseous mixture into fractions, comprising continuously moving lengthwise a column of gas separation material for which one of said fractions has less affinity than another, delivering an eluting gas to the column at a predetermined inlet point, releasing eluting gas from the column at two outlet points spaced lengthwise of the column in locations where some of the eluting gas will flow upstream through the column to both of said outlet points and the rest of the eluting gas will flow in the opposite direction, and delivering said gaseous mixture to the column between said outlet points, whereby said one fraction of said mixture will be carried upstream by the eluting gas through the column and out of it at the upstream outlet point and the rest of the mixture will be carried by the column downstream toward the other outlet point where a second fraction will escape with the eluting gas leaving at that point.

2. Apparatus for continuous separation of components of a gaseous mixture, comprising an upwardly extending conduit, a reservoir for gas separation material at the lower end of the conduit, means for moving a column of said material up through the conduit continuously, a reservoir at the upper end of the conduit for receiving said material from the conduit, and means for returning said material from the upper reservoir to the lower reservoir, the side of the conduit being provided with an eluting gas inlet passage and with two vertically spaced outlet passages below said inlet passage, and said conduit also being provided with an inlet passage between said outlet passages for delivering a gas mixture to the column for separation.

3. Apparatus for continuous separation of components of a gaseous mixture, comprising an upwardly extending conduit, a reservoir for gas separation material at the lower end of the conduit, means for moving a column of said material up through the conduit continuously, a reservoir at the upper end of the conduit for receiving said material from the conduit, a hopper provided with an inlet for stripping gas and with a gas outlet, a pipe connecting the bottom of the upper reservoir with the top of the hopper, and a pipe connecting the bottom of the hopper with the top of the lower reservoir, the side of the conduit being provided with an eluting gas inlet passage and with two vertically spaced outlet passages below said inlet passage, and said conduit also being provided with an inlet passage between said outlet passages for delivering a gas mixture to the column for separation.

4. Apparatus for continuous separation of components of a gaseous mixture, comprising a straight upright conduit, a closed casing enclosing the conduit but spaced therefrom, said casing forming a reservoir for gas separation material, means for moving a column of said material up through the conduit continuously and out of its upper end, the side of the conduit being provided with an eluting gas inlet passage and with two vertically spaced outlet passages below said inlet passages, and said conduit also being provided with an inlet passage between said outlet passages for delivering a gas mixture to the column for separation.

5. Apparatus according to claim 4, in which said casing is provided with a stripping gas inlet communicating with said material outside of the conduit, and the upper end of the conduit is provided with a gas outlet.

References Cited in the file of this patent

UNITED STATES PATENTS

| | | |
|---|---|---|
| 2,397,566 | Schutte | Apr. 2, 1946 |
| 2,519,873 | Berg | Aug. 22, 1950 |
| 2,869,672 | Findlay | Jan. 20, 1959 |

FOREIGN PATENTS

| | | |
|---|---|---|
| 1,033,638 | Germany | July 10, 1958 |